(12) United States Patent
Kurtz et al.

(10) Patent No.: US 12,222,557 B2
(45) Date of Patent: Feb. 11, 2025

(54) FERRULE WITH MOLDED INTERNAL TILTED REFRACTIVE SURFACES

(71) Applicant: US Conec Ltd., Hickory, NC (US)

(72) Inventors: Daniel Kurtz, Huntersville, NC (US); Ke Wang, Waxhaw, NC (US); Darrell R Childers, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 238 days.

(21) Appl. No.: 17/794,808

(22) PCT Filed: Jan. 25, 2021

(86) PCT No.: PCT/US2021/014886
§ 371 (c)(1),
(2) Date: Jul. 22, 2022

(87) PCT Pub. No.: WO2021/151064
PCT Pub. Date: Jul. 29, 2021

(65) Prior Publication Data
US 2023/0147914 A1    May 11, 2023

Related U.S. Application Data

(60) Provisional application No. 62/965,280, filed on Jan. 24, 2020.

(51) Int. Cl.
G02B 6/38 (2006.01)
(52) U.S. Cl.
CPC ......... *G02B 6/3853* (2013.01); *G02B 6/3818* (2013.01); *G02B 6/3882* (2013.01); *G02B 6/3885* (2013.01)

(58) Field of Classification Search
CPC ... G02B 6/3853; G02B 6/3818; G02B 6/3882
See application file for complete search history.

(56) References Cited

U.S. PATENT DOCUMENTS 6,012,852 A   1/2000   Kadar-Kallen et al.
6,377,743 B1  4/2002   Ueda et al.
(Continued)

FOREIGN PATENT DOCUMENTS

EP    2998770 B1    10/2019
JP    20090258510 A 11/2009
(Continued)

OTHER PUBLICATIONS

Written Opinion of the ISA; Aug. 11, 2021; 7 pages.
(Continued)

*Primary Examiner* — Sung H Pak
(74) *Attorney, Agent, or Firm* — Michael L Leetzow PLLC; Shubhrangshu Sengupta

(57) ABSTRACT

A fiber optic ferrule has a main body having a front end, a rear end, and a top surface and a bottom surface joined together by opposing side surfaces and has a longitudinal axis. There are a plurality of optical fiber support structures disposed between the front end and rear end and configured to receive a plurality of optical fibers. The fiber optic ferrule has an end face at the front end of the fiber optic ferrule through which an optical beam passes. There are also a front facing refractive surface and a rear facing refractive surface, the rear facing refractive surface being closer to the end face than the front facing refractive surface, both being at an angle to the front facing refractive surface.

14 Claims, 10 Drawing Sheets

(56) References Cited

U.S. PATENT DOCUMENTS

| | | |
|---|---|---|
| 7,058,275 B2 | 6/2006 | Sezerman et al. |
| 7,510,337 B2 | 3/2009 | Takeda et al. |
| 9,091,822 B2 | 7/2015 | DeMerritt et al. |
| 9,563,027 B2 | 2/2017 | Childers et al. |
| 10,197,743 B2 | 2/2019 | Childers et al. |
| 10,222,559 B2 | 3/2019 | Nakama et al. |
| 10,564,365 B2 | 2/2020 | Maruyama et al. |
| 10,585,248 B2 | 3/2020 | Childers et al. |
| 10,620,387 B2 | 4/2020 | Bushnell et al. |
| 10,698,165 B2 | 6/2020 | Kadar-Kallen et al. |
| 11,125,950 B2 | 9/2021 | Watanabe et al. |
| 11,467,352 B2 | 10/2022 | Nakama et al. |
| 2011/0091167 A1 | 4/2011 | Nishimura |
| 2013/0168537 A1 | 7/2013 | Shin |
| 2015/0153518 A1 | 6/2015 | Kuo et al. |
| 2015/0234129 A1* | 8/2015 | Akabane ............. G02B 6/3882 156/293 |
| 2017/0146748 A1 | 5/2017 | Childers et al. |
| 2017/0160485 A1 | 6/2017 | Wan |
| 2017/0184793 A1 | 6/2017 | Watanabe et al. |
| 2018/0239092 A1 | 8/2018 | Childers et al. |
| 2018/0267251 A1 | 9/2018 | Childers |
| 2020/0088954 A1* | 3/2020 | Nakama ................... G02B 6/40 |
| 2020/0103597 A1 | 4/2020 | Watanabe et al. |
| 2020/0264386 A1 | 8/2020 | Hodge et al. |
| 2022/0137303 A1 | 5/2022 | Otomitsu et al. |
| 2022/0146758 A1 | 5/2022 | Childers et al. |
| 2022/0390684 A1 | 12/2022 | Kurtz et al. |

FOREIGN PATENT DOCUMENTS

| | | |
|---|---|---|
| JP | 7159791 B2 | 10/2022 |
| WO | 2018089286 A1 | 5/2018 |
| WO | 2018221717 A1 | 12/2018 |
| WO | 2020046965 A1 | 3/2020 |
| WO | 2020105258 A1 | 5/2020 |
| WO | 2020230363 A1 | 11/2020 |

OTHER PUBLICATIONS

International Search Report, 3 pages; May 13, 2021.
Translation of WO2020105258 Previously submitted ; 20 pages; Nakama et al.
Extended European Search Report and written opinion; 8 pages dated Jan. 16, 2024.

* cited by examiner

FERRULE WITH MOLDED INTERNAL TILTED REFRACTIVE SURFACES

REFERENCE TO RELATED CASE

This application claims priority under 35 U.S.C. § 119 (e) to U.S. provisional application No. 62/965,280 filed on Jan. 24, 2020, the contents of which are hereby incorporated by reference in their entirety.

BACKGROUND OF THE INVENTION

Lensed ferrules are used in a variety of mid-board and edges of circuit boards with optoelectronic conversion features, as well as in different optical fiber cabling connection applications. As optical communication moves towards single mode fiber applications, as wells as the introduction of smaller diameter fibers, tighter tolerances are needed for lensed ferrules, including single mode fiber applications.

Certain ferrules under development have tilted external lenses, i.e., lenses exposed to the environment on an end face of the fiber optic ferrule that are tilted with respect to the longitudinal axis of the optical fiber. One such external tilted lens is discussed in co-pending application PCT/US20/58794 filed by the Applicant, the contents of which are hereby incorporated by reference in their entirety. Certain other lensed ferrule solutions include total internal reflection (TIR) lenses, typically for mid-board applications, but maybe applicable to fiber-to-fiber connections.

External lenses are generally prone to issues resulting from condensation, dust, debris, and/or scratching. Further, the presence of lenses on the end face of the ferrule makes it harder to clean the end face. Ferrules utilizing TIR lenses are bulkier, and mating two TIR lensed ferrules requires more space than other lensed ferrules. TIR fiber optic ferrules are typically single row, and are difficult to migrate to multi-row applications. Further, conventional tilted lens ferrules can be mated only in a particular orientation—key-up to key-down.

Thus, there is a need for a fiber optic ferrule with molded internal refractive surfaces at an angle to the longitudinal axis (e.g., tilted lenses). The optical beams pass through a window having a planar surface that is tilted to the end-face at an angle. The tilted arrangement of the internal lenses and the exit window causes the beam of the lensed ferrule to be parallel to the longitudinal axes of the optical fibers. This arrangement makes the fiber optic ferrules polarity immune or self-checking with respect to the orientation during mating with another mating ferrule, and thus can be mated key-up to key-up or key-up to key-down.

SUMMARY OF THE INVENTION

The present invention is directed to a fiber optic ferrule that includes a main body having a front end, a rear end, and a top surface and a bottom surface joined together by opposing side surfaces, the main body having a longitudinal axis extending between the front end and the rear end, plurality of optical fiber support structures disposed between the front end and rear end and configured to receive a plurality of optical fibers, an end face at the front end of the fiber optic ferrule through which an optical beam passes, and a front facing refractive surface and a rear facing refractive surface, the front facing refractive surface and the rear facing refractive surface located between the end face and the plurality of optical fiber support structures, the rear facing refractive surface being closer to the end face than the front facing refractive surface, and being at an angle to the front facing refractive surface.

In some embodiments, the front facing refractive surface and the rear facing refractive surface are separated from each other by a lens gap.

In some embodiments, the end face has an exit window through which the optical beam passes and the exit window is not orthogonal to the longitudinal axis.

In some embodiments, the fiber optic ferrule further includes two guide pins and two guide pin holes extending from the front end toward the rear end, the guide pins being diagonally spaced across the end face.

In some embodiments, the convex lenses are integrally molded with the main body.

In some embodiments, the main body has a first portion and a second portion, the second portion comprising a portion of the top surface.

In yet another aspect, the fiber optic ferrule has a housing in which the fiber optic ferrule is received and securely held.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
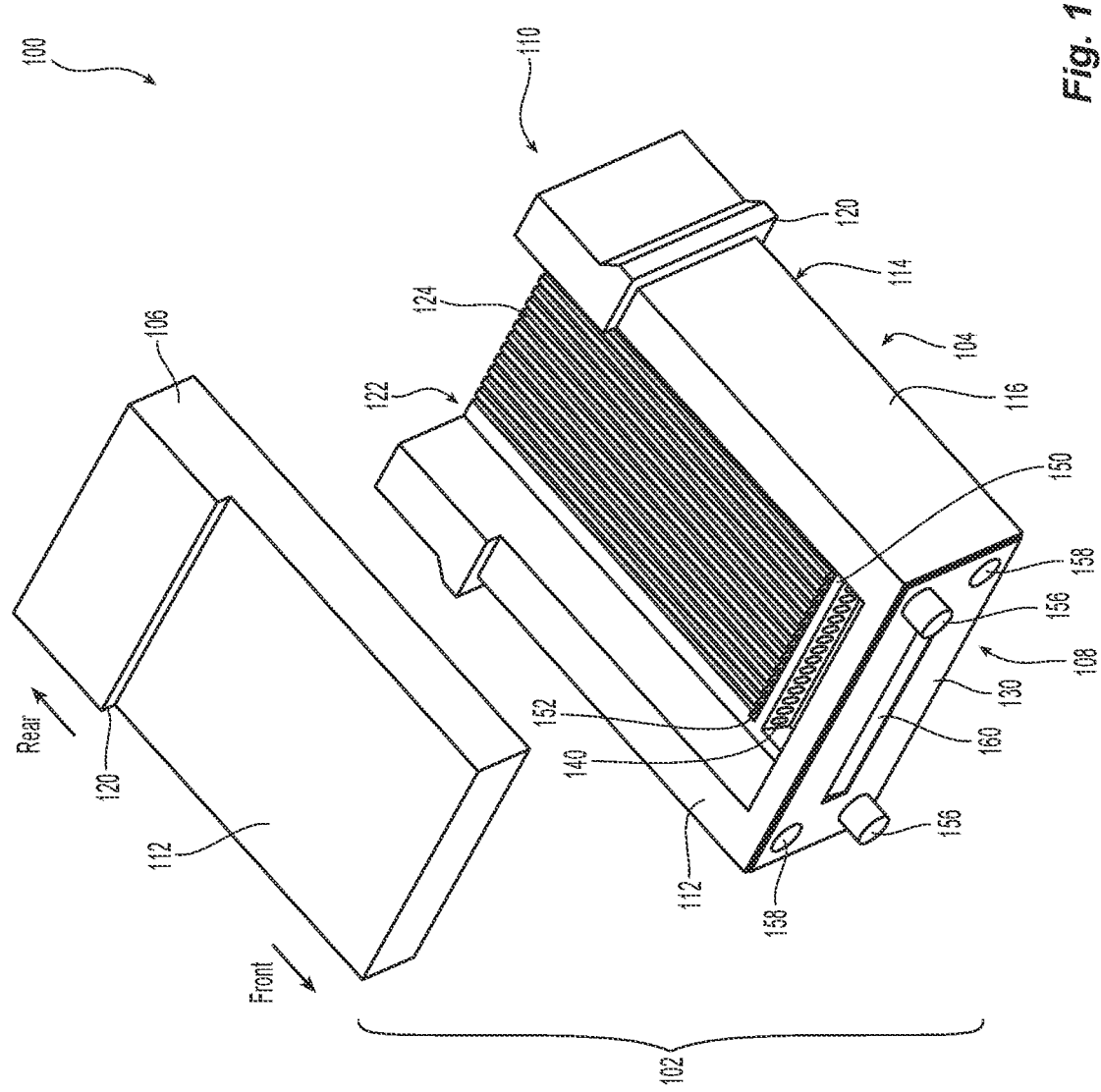
FIG. 1 is a perspective view of one embodiment of a fiber optic ferrule according to the present invention.
Figure 2:
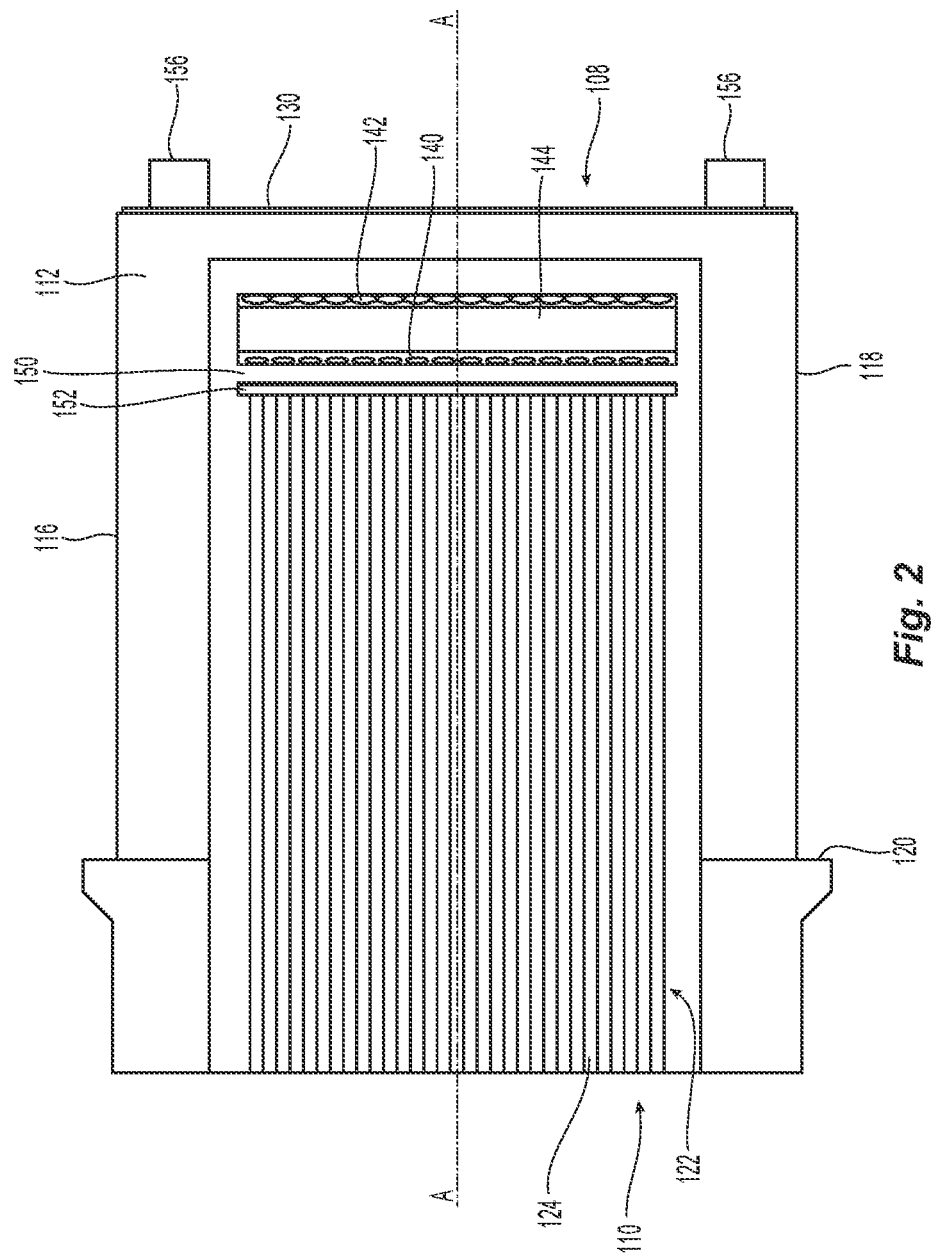
FIG. 2 is a top plan view of one portion of the fiber optic ferrule in FIG. 1 with a second portion removed.
Figure 3:
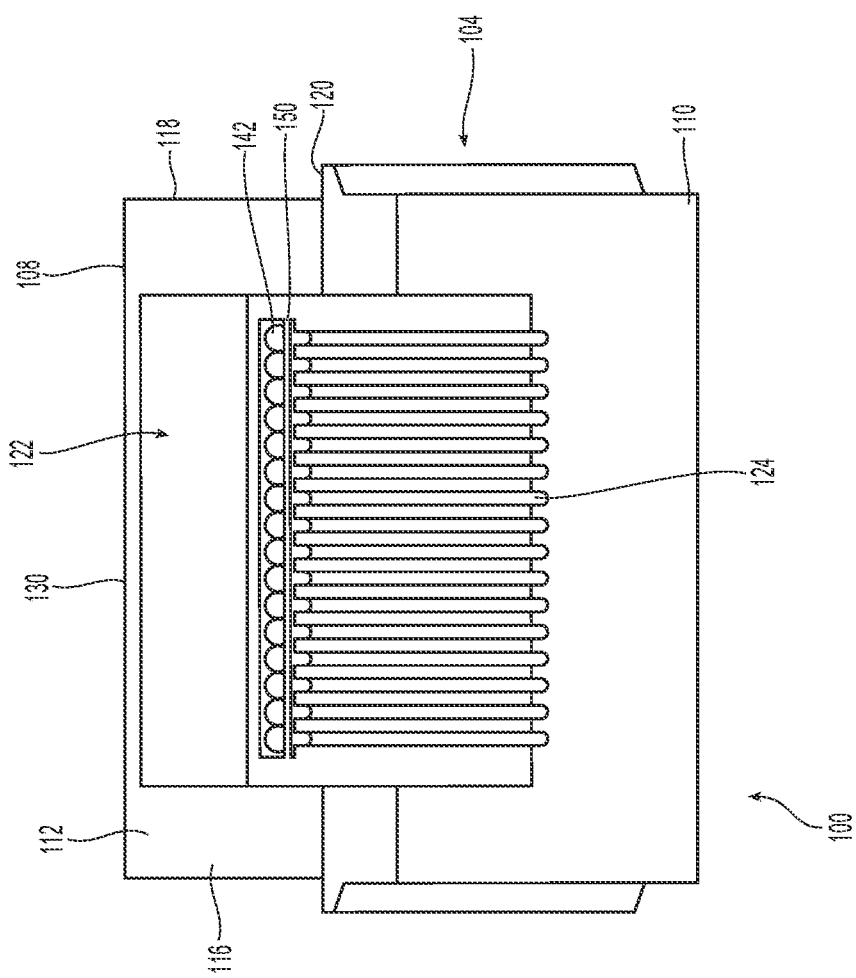
FIG. 3 is a perspective view of the fiber optic ferrule in FIG. 1 from above and behind the fiber optic ferrule.
Figure 4:
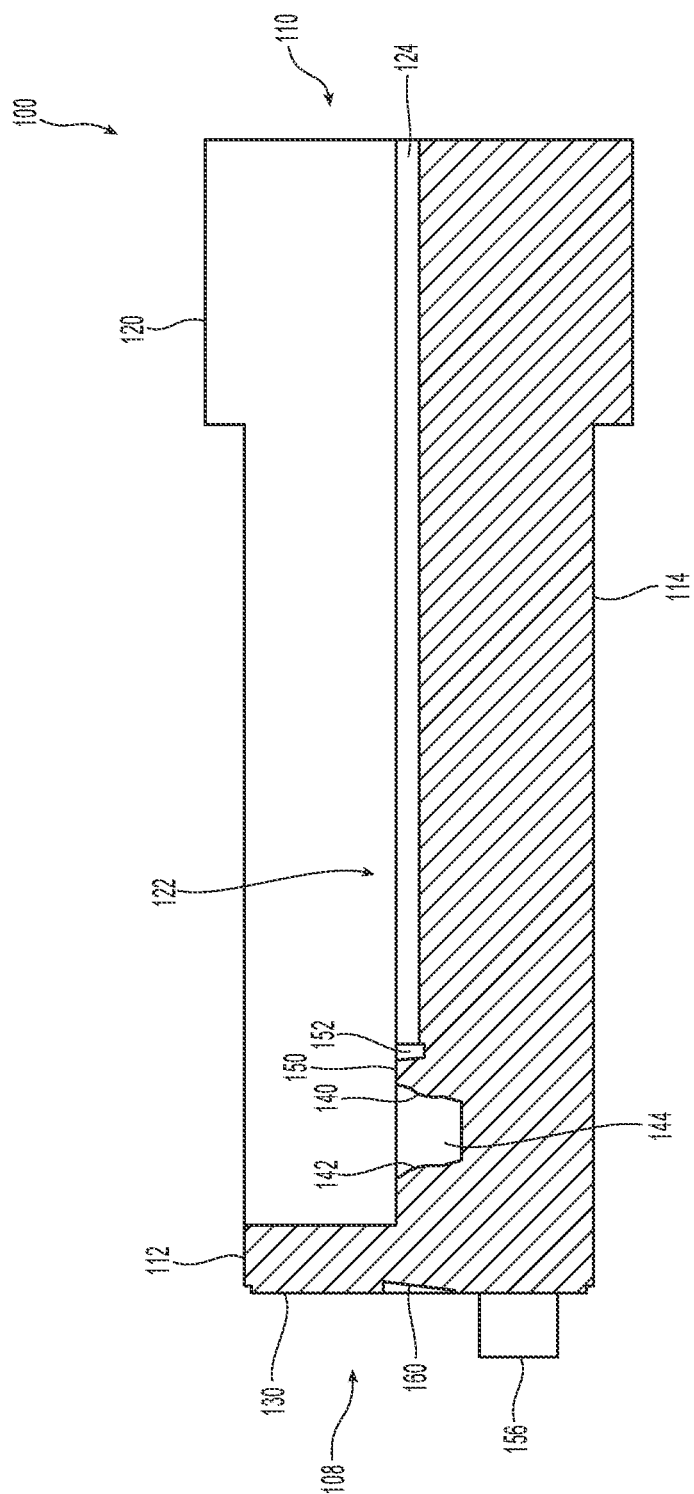
FIG. 4 is a cross sectional view of the fiber optic ferrule in FIG. 1 along a longitudinal axis.

Reference will now be made in detail to the present preferred embodiment(s) of the invention, examples of which are illustrated in the accompanying drawings. Whenever possible, the same reference numerals will be used throughout the drawings to refer to the same or like parts.

Applicant notes that the term "front" or "forward" means that direction where the fiber optic connector and/or the ferrule would meet with another fiber optic connector or device, while the term "rear" or "rearward" is used to mean the direction from which the optical fibers enter into the fiber-optic ferrule, the fiber optic connector, or the ferrule push. Each of the components will therefore have a front and rear, and the two fronts or forward portions of the fiber optic ferrules would engage one another. Thus, in FIG. 1, the "front" of the fiber optic ferrule is on the left side of FIG. 1 and "forward" is to the left and out of the page. "Rearward" or "rear" is that part of the fiber optic ferrule or cover that is on the right side of the page and "rearward" and "backward" is toward the right and into the page.

Figure 5:
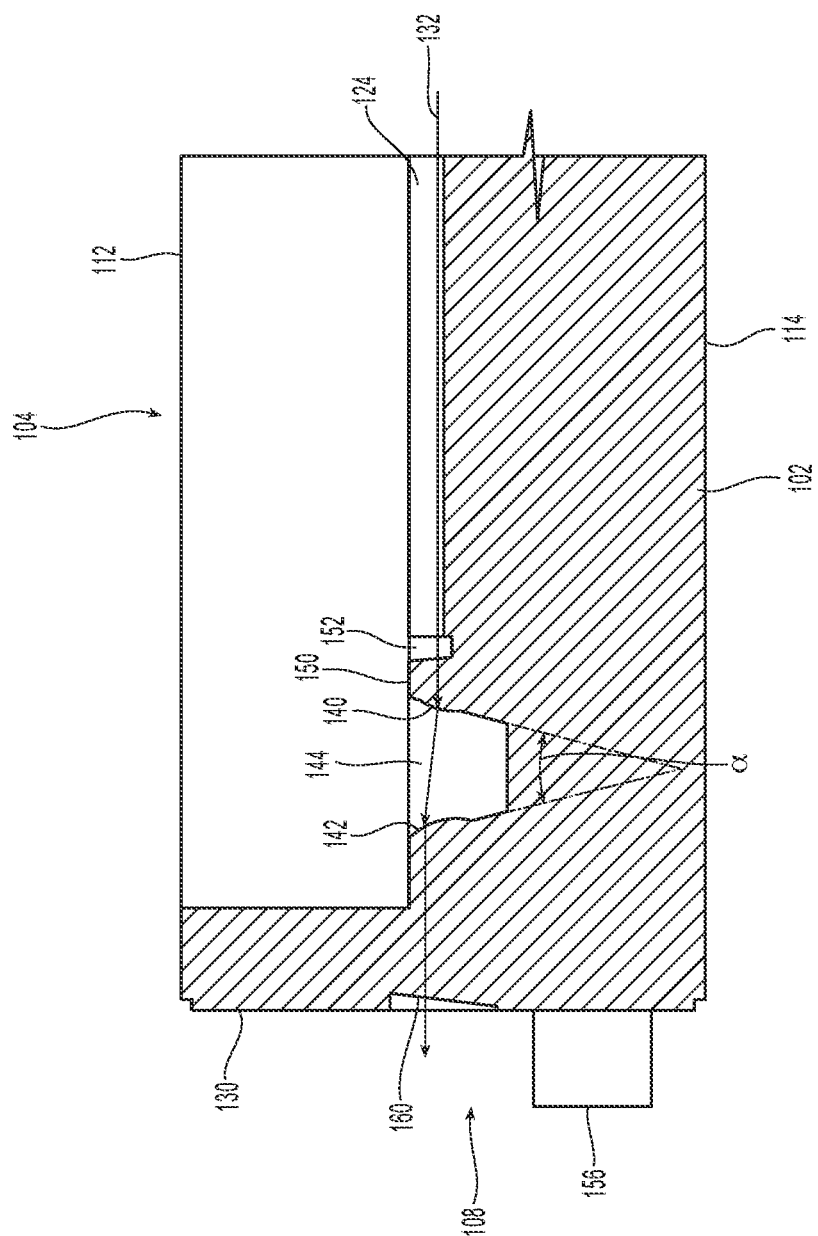
FIG. 5 is a partial cross sectional view of the front of the fiber optic ferrule in FIG. 1.

One embodiment of a fiber optic ferrule 100 according to the present invention is illustrated in FIGS. 1-10. The fiber optic ferrule 100 has a main body 102, the main body 102 may have a first portion 104 and a second portion 106. The main body 102 has a front end 108, a rear end 110, and a top surface 112 and a bottom surface 114, the top surface 112 and the bottom surface 114 being joined by opposing side surfaces 116 and 118 (see FIG. 2). The fiber optic ferrule may also include a larger rear end with a shoulder 120, but the shoulder 120 could be eliminated and still fall within the scope of the present invention. The second portion 106 may include some of the top surface 112, the larger rear end 110, and the shoulder 120, if present. The main body 102 has a longitudinal axis A extending between the front end 108 and the rear end 110. In a central opening 122 within the main body 102 (and partially formed by the first portion 104 and a second portion 106 if there are two portions rather than a single element) are a plurality of optical fiber support structures 124. The optical fiber support structures 124 are positioned between the front end 108 and rear end 110 and configured to receive a plurality of optical fibers (not shown). The optical fiber support structures 124 may be v-grooves, u-grooves, fiber holes, or any other appropriate structures to hold and guide a plurality of optical fibers within the fiber optic ferrule 100. While there are 12 spaces provided for in a single row in this fiber optic ferrule 100, there could be a row of two, four, eight, twelve or sixteen fibers. Additionally, there could also be more than one row of optical fibers. When there are more than one row of optical fibers, the optical fiber support structures 124 are arranged in a stepped format, with one set of structures for one row above/below the other. For example, two rows of the optical fiber support structures 124 would require that an optical axis of the optical beam 132 in the optical fiber support structures 124, as shown in FIG. 5 would need to be moved up on the first portion 104 (to the right in the FIG. 5), and then all the features making up that optical axis would be accordingly positioned in FIG. 5. For example, either additional front facing refractive surfaces and rear facing refractive surfaces may be provided to correspond to and align with the additional rows of optical fibers. Alternatively, the same front facing refractive surface 140 and the rear facing refractive surface 142 may be utilized with appropriate correction for the variation in the optical path of the optical beams from those additional rows prior to interaction with the front facing refractive surface 140 and the rear facing refractive surface 142.

Since at least the first portion 104 is made of an optically clear material, the optical beams transported by the optical fibers of each of these rows can travel in the manner similar to the optical beam in the optical fibers supported by the optical fiber support structures 124.

The optical fiber support structures 124 preferably extend between at least a portion of the distance between the front end 108 and the rear end 110. However, as illustrated, the optical fiber support structures 124 extend from the rear end 110 towards the front end 108, but stop short of the front end 108. Similarly, the optical fiber support structures 124 may start inward (i.e., more toward the front end 108) of the rear end 110, in which case there is a downward ramp (not shown) immediately behind the optical fiber support structures 124 and all the way to the rear end 110 to aid in placing the optical fibers securely without bending or any obstruction.

The fiber optic ferrule 100 also has an end face 130 at the front end 108 through which an optical beam 132 passes. As illustrated in FIG. 5, the optical beam 132 is illustrated as entering from the rear end 110 and exiting the front end 108. However, the optical beam 132 can pass in either direction through the fiber optic ferrule 100—in a front to rear manner or a rear to front manner and still be within the scope of the present invention.

The fiber optic ferrule 100 also has a front facing refractive surface 140 and a rear facing refractive surface 142. See FIGS. 4-6. The front facing refractive surface 140 and the rear facing refractive surface 142 are disposed in the optical path 132 of the fiber optic ferrule 100 (and determine the path of the optical beams 132), and between the optical fiber support structures 124 and the end face 108. See FIGS. 5 & 6. The rear facing refractive surface 142 is closer to the end face 108 than the front facing refractive surface 140. The refraction provided by these surfaces 140,142 may be in the form of curved surfaces, such as convex lenses, or flat surfaces with refraction being controlled by the angle of the surface. However, such refractive surfaces or lens surfaces in the fiber optic ferrule 100 do not cause total-internal reflection, and have very low back reflection into the optical fibers (i.e., low return loss). The rear facing refractive surface 142 is tilted at an angle to the front facing refractive surface 140. For example, the rear facing refractive surface 142 may be inclined at an angle of 6.4° to a plane perpendicular to the longitudinal axis A and the front facing refractive surface 140 may be inclined at an angle of 9.5°, also to a plane perpendicular to the longitudinal axis A, but in an opposite direction to the 6.4° angle. This results in the angle α=6.4°+9.5°=15.9°, although there may be a variation in the angle α by ±0.05°. Thus, the front facing refractive surface 140 and the rear facing refractive surface 142 are not orthogonal to the longitudinal axis A and the optical beam 132. It will be appreciated by one of ordinary skill in the art in view of this patent application that the angle above can be varied to accommodate various optical parameter variations (e.g., change is a material of the first portion 104, optical path traversed by the optical beams, return loss requirements for the fiber optic ferrule 102, and the like).

The front facing refractive surface 140 and the rear facing refractive surface 142 are disposed on opposite sides of a lens gap 144. The lens gap 144 may be filled with an index matching material (epoxy) having refractive index similar to that of the core of the optical fibers. Alternatively, the lens gap 144 may simply be empty or have air. If the lens gap has air, there may be an anti-reflective coating on the refractive lens surfaces to reduce the back reflections and insertion loss. Generally, the lens gap 144 forms an optical gap between the front facing refractive surface 140 and the rear facing refractive surface 142.

The front facing refractive surface 140 and the rear facing refractive surface 142 are molded with the remainder of the fiber optic ferrule 100—meaning that the lenses/reflective surfaces are integral with and formed at the same time as the fiber optic ferrule 100. As best seen in FIG. 5, the front facing refractive surface 140 and the rear facing refractive surface 142 are vertically offset from one another, although in alternative aspects of this disclosure, the front facing refractive surface 140 and the rear facing refractive surface 142 may not be vertically offset. The front facing refractive surface 140 is closer to the bottom surface 114 than the rear facing refractive surface 142. With the appropriate surfaces and angles, it may be possible that the surface are vertically the same or inverted, with the rear facing refractive surface 142 being closer to the bottom surface 114 than the front facing refractive surface 140. The rear facing refractive surface 142 and the front facing refractive surface 140 are irregular, and only a portion of the lenses are used to control the direction of the optical beam 132 relative to the longitudinal axis A. Further, the rear facing refractive surface 142 and the front facing refractive surface 140 may be parts of two mathematically different lens surfaces or lenses. The lens gap 144 is preferably filled with an index matching epoxy that matches the optical fiber cores, but it may also remain empty (air-filled).

The fiber optic ferrule 100 also has an optical fiber facing surface 150, the optical fiber facing surface 150 is disposed between the front end of the plurality of optical fiber support structures 124 and the front facing refractive surface 140 and can be used as an optical fiber stop surface. When, as discussed in more detail below, the optical fibers are inserted into the fiber optic ferrule 100, the optical fiber facing surface 150 can be used as a reference and/or stop surface. To reduce the back reflection the fiber facing surface may be designed to not be orthogonal to the fiber support structures. Between the optical fiber facing surface 150 and the plurality of optical fiber support structures 124 is an optical fiber end face receptacle 152. The optical fiber end face receptacle 152 is configured to receive the ends of the optical fibers when they are laser cleaved. The ends of the laser-cleaved optical fibers tend have a "mushroom effect" caused by an expansion or swelling of the end of the optical fibers from the heat imparted during laser cleaving. This effect is not present in mechanically-cleaved optical fibers. The optical fiber end face receptacle 152 provides a space for the larger ends of the optical fibers and eliminates any potential for mis-alignment of the optical fibers due to the enlarged ends. In an alternative embodiment, the optical fiber end face receptacle 152 may be optional or absent. The fibers may be cleaved with an intentional angle to reduce the back reflection.

The main body 102 may have a first portion 104 and a second portion 106 which allows for easier molding of the fiber optic ferrule 100. The first portion 104 and the second portion 106 may be made of the same material or may be made of different materials. The second portion 106 includes a portion of the top surface 112 and the shoulder 120. The second portion 106 can be attached to the first portion 104 in a number of ways, including a friction-fit, the use of adhesives, welding, etc. Optical fibers can be inserted into the fiber optic ferrule 100 from the top when the second portion 106 is removed by placing the optical fibers into the optical fiber support structures 124. A user can ensure placement within the optical fiber support structures 124 and that the optical fiber ends engage the optical fiber end face receptacle 152. The optical fibers can be secured within the plurality of optical fiber support structures 124 using an index matching epoxy that matches the optical fiber cores. If the main body 102 does not have two pieces, then the optical fibers can be guided into the plurality of optical fiber support structures 124 from the rear end 110. The plurality of optical fiber support structures 124 may also be configured to accept smaller diameter optical fibers. For example, the optical fibers could have a smaller diameter (80 μm) or have a pitch (distance between the optical fibers) of less than the standard 250 μm. After the optical fibers are secured within the first portion 104, the second portion 106 can be attached thereto.

The fiber optic ferrule 100 has an end face 130 at the front end 108. The end face 130 has two guide pins 156 and two guide pin holes 158. As seen best in FIG. 1, on each side of the fiber optic ferrule 100 are one guide pin 156 and one guide pin hole 158. The guide pins 156 are disposed diagonally across from one another as too are the guide pin holes 158. As noted below, this allows for the fiber optic ferrule 100 to be mated with another fiber optic ferrule key-up to key-up, or key-up to key-down. That is, due to this diagonal spatial relationship between the two guide pins 156 (and similarly between the two guide pin holes 158), the orientation of two identical mating ferrules 100 about their respective longitudinal axes A is irrelevant, as long as the optical beams passing through the exit window 160 follow the same optical path between the two mating ferrules 100.

Figure 6:
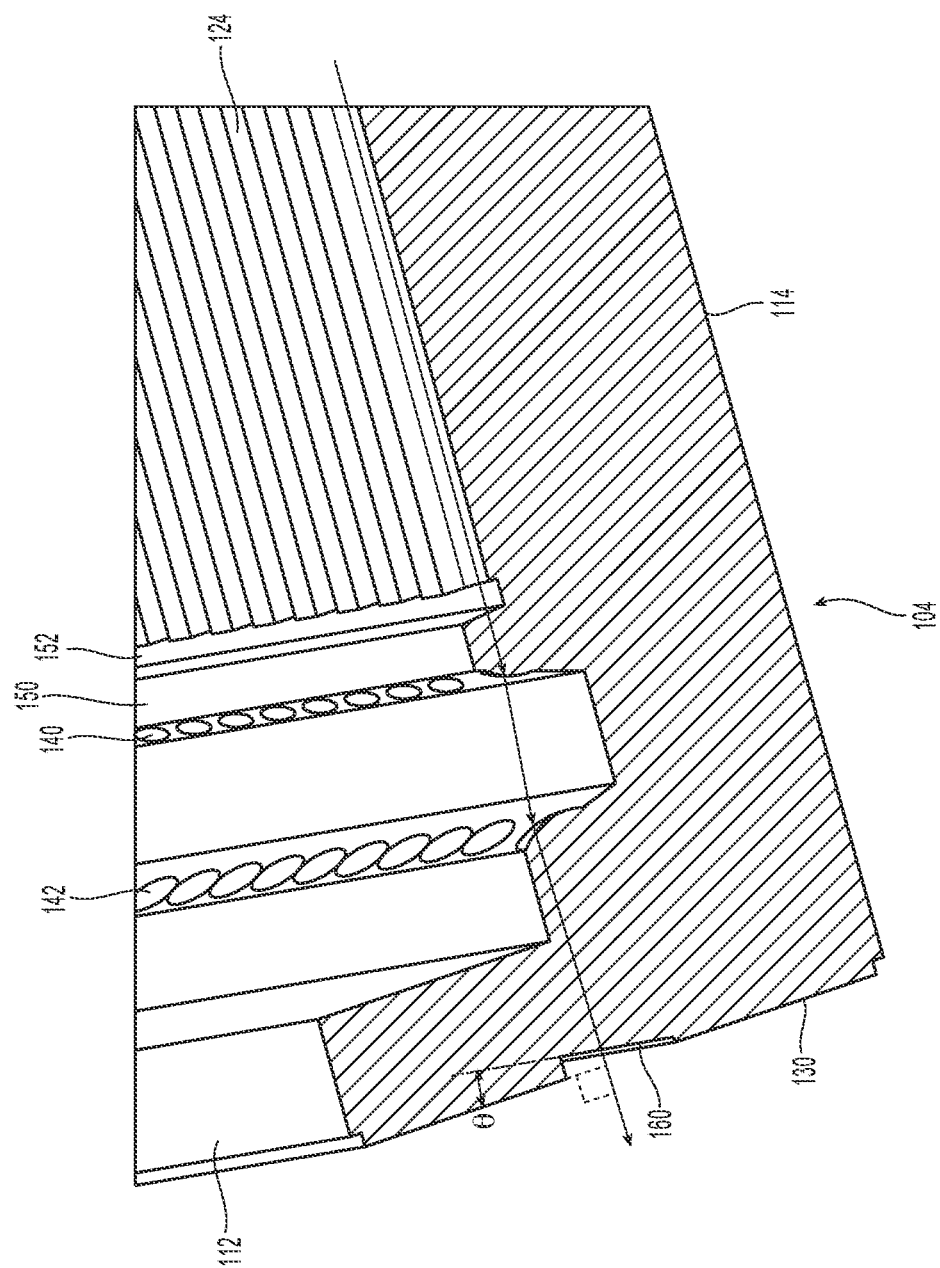
FIG. 6 is a partial cross sectional view of the front end of the fiber optic ferrule in FIG. 1.

The end face 130 also has an exit window 160 through which the optical beam 132 passes. See FIGS. 1 and 4-6. As best seen in FIG. 6, the exit window 160 is not orthogonal to the longitudinal axis A or the rest of the end face 130 and is preferably flat. However, it may also have a curvature to it as well. Yet alternatively, the exit window 160 may be orthogonal to the longitudinal axis A (albeit with some added back reflection). The exit window 160 is tilted at an angle θ—preferably ±2.3°, i.e., the angled exit window may tilt in a direction opposite to that shown. The exit window 160 or the end face 130 in general may be coated with an anti-reflection coating to reduce back reflection. The flatness of the exit window 160 allows for easier cleaning of the fiber optic ferrule 100 and also mitigates the effects of any liquid residue between two mating fiber optic ferrules since the exit window 160 is not a lens surface. It also directs the optical beam 132 to be parallel to the longitudinal axis A. The exit window 160 is also preferably located symmetrically within the front end 108 and covers all of the plurality of optical fibers and refractive surfaces 140,142 for all of the optical fibers, when viewed in an elevation view from the front end 108. However, it may be disposed elsewhere at the front end 108 depending on the placement of the other fiber optic ferrule structures on the optical fibers.

Figure 7:
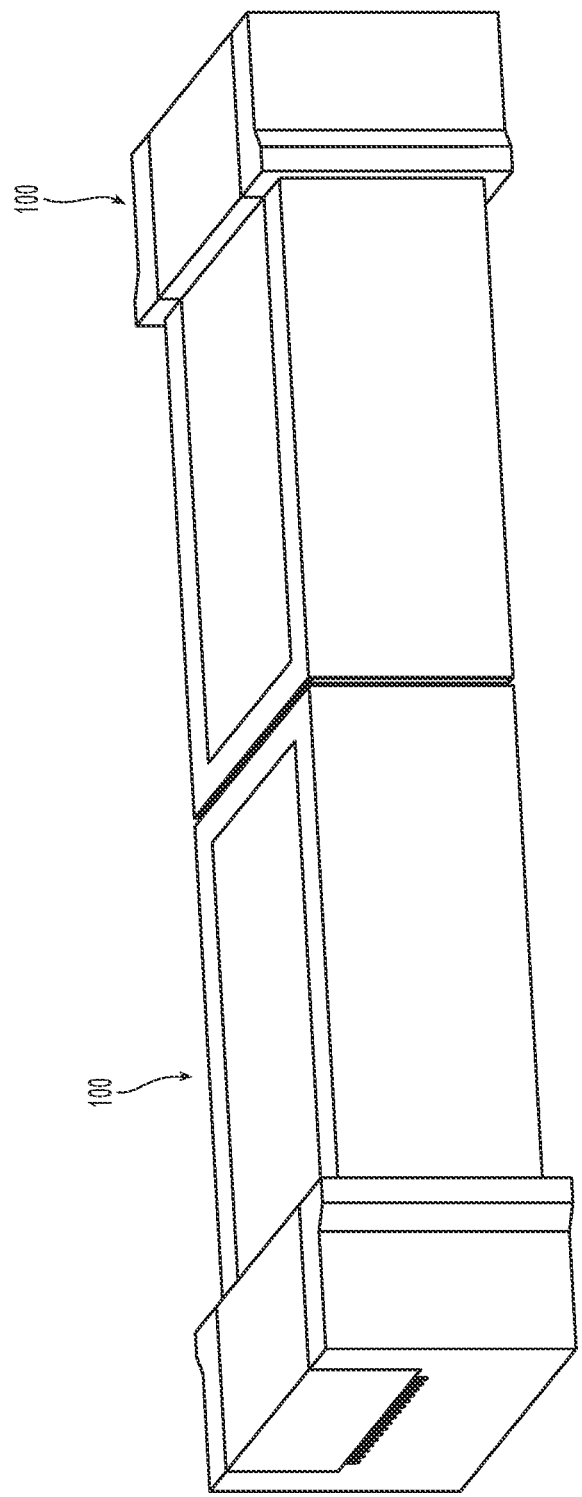
FIG. 7 illustrates two of the fiber optic ferrules in FIG. 1 in a mated relationship in a key-up to key-up orientation.
Figure 8:
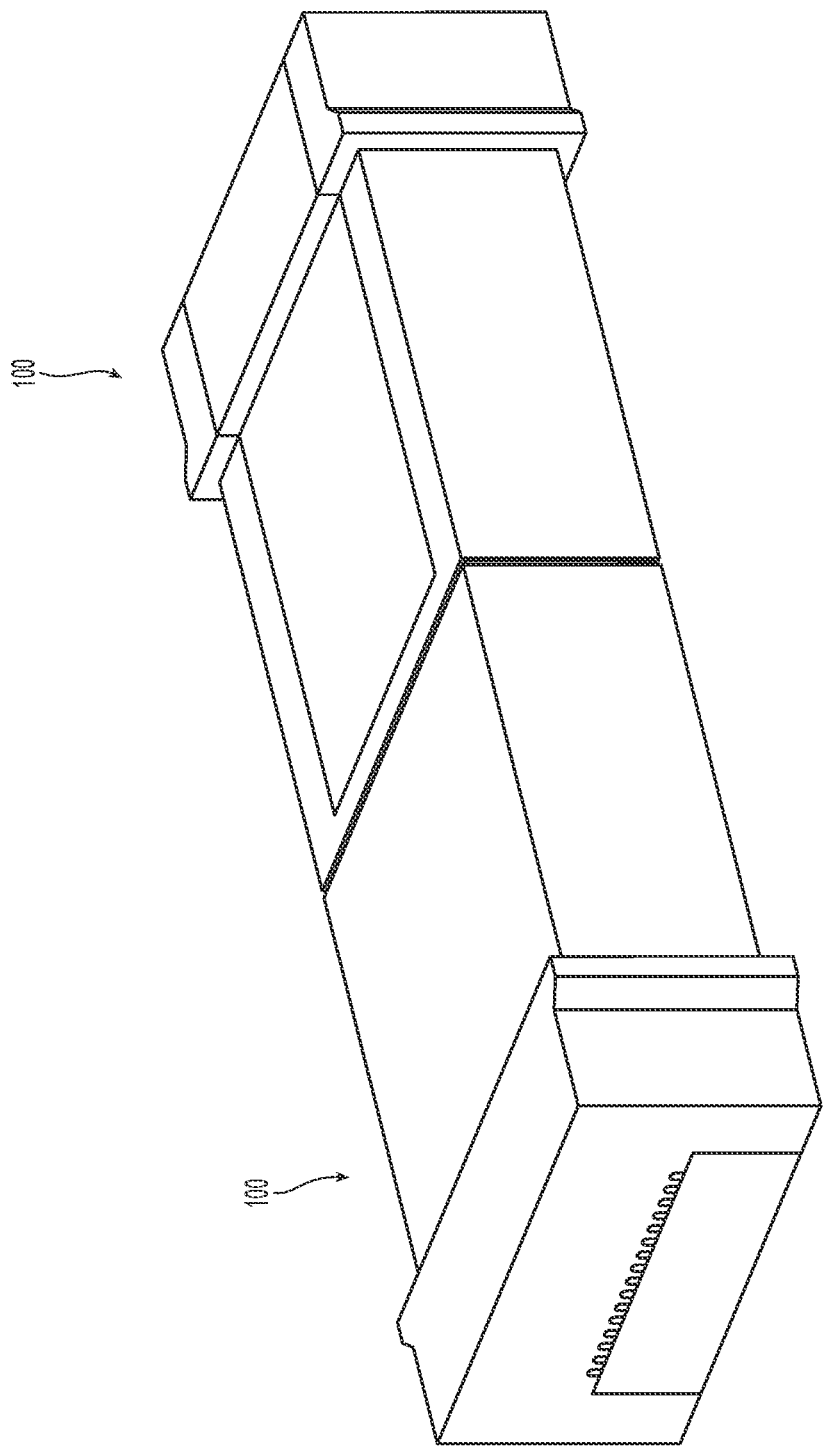
FIG. 8 illustrates two of the fiber optic ferrules in FIG. 1 in a mated relationship in a key-up to key-down orientation.
Figure 9:
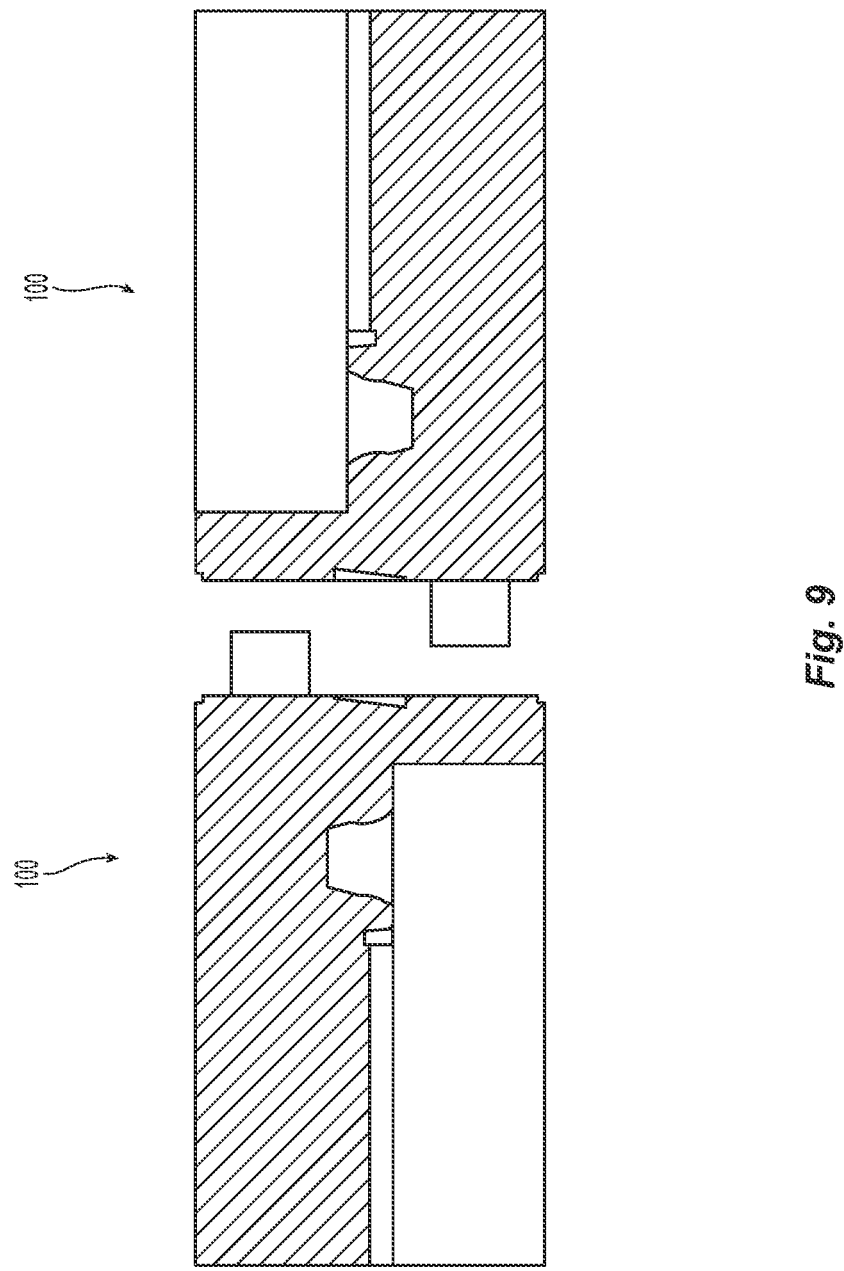
FIG. 9 is side elevation view of the two fiber optic ferrules in FIG. 8 in a premating configuration.

The structures of the fiber optic ferrules 100 allows for two of the fiber optic ferrules 100 to be mated in a key-up to key-up configuration as illustrated in FIG. 7. As noted above with regard to the guide pins 156 and the guide pin holes 158, two of the fiber optic ferrules could also be mated in a key-up to key-down configuration as illustrated in FIGS. 8 and 9. FIG. 9 shows that internal structures of the fiber optic ferrules allow for the alignment in the key-up to key-down configuration. It should be noted that the fiber optic ferrules 100 could be mated as illustrated. As can be seen in FIG. 9, even if one of the fiber optic ferrules 100 were flipped about the respective longitudinal axis A (i.e., to result in the key-up to key-up configuration of FIG. 7), the optical connection would not be affected since the optical beams between the two fiber optic ferrules 100 would still follow the same path. In this sense, the fiber optic ferrules 100 are polarity immune and are self-checking in terms of connecting to each other.

However, if polarity is not a concern, then the fiber optic ferrule 100 may not have the diagonally placed hermaphroditic guide pin arrangement, such as the one shown in FIGS. 1-19. In that case, a single guide-pin and a single guide hole may be provided on either side of the exit window 160 in a central location relative to a vertical plane of the end face 130 (perpendicular to the longitudinal axis A). Yet alternatively, the guide pins may not be integrally molded and may instead be removable metallic guide pins, used with certain other conventional fiber optic ferrules known to one of ordinary skill in the art.

Figure 10:
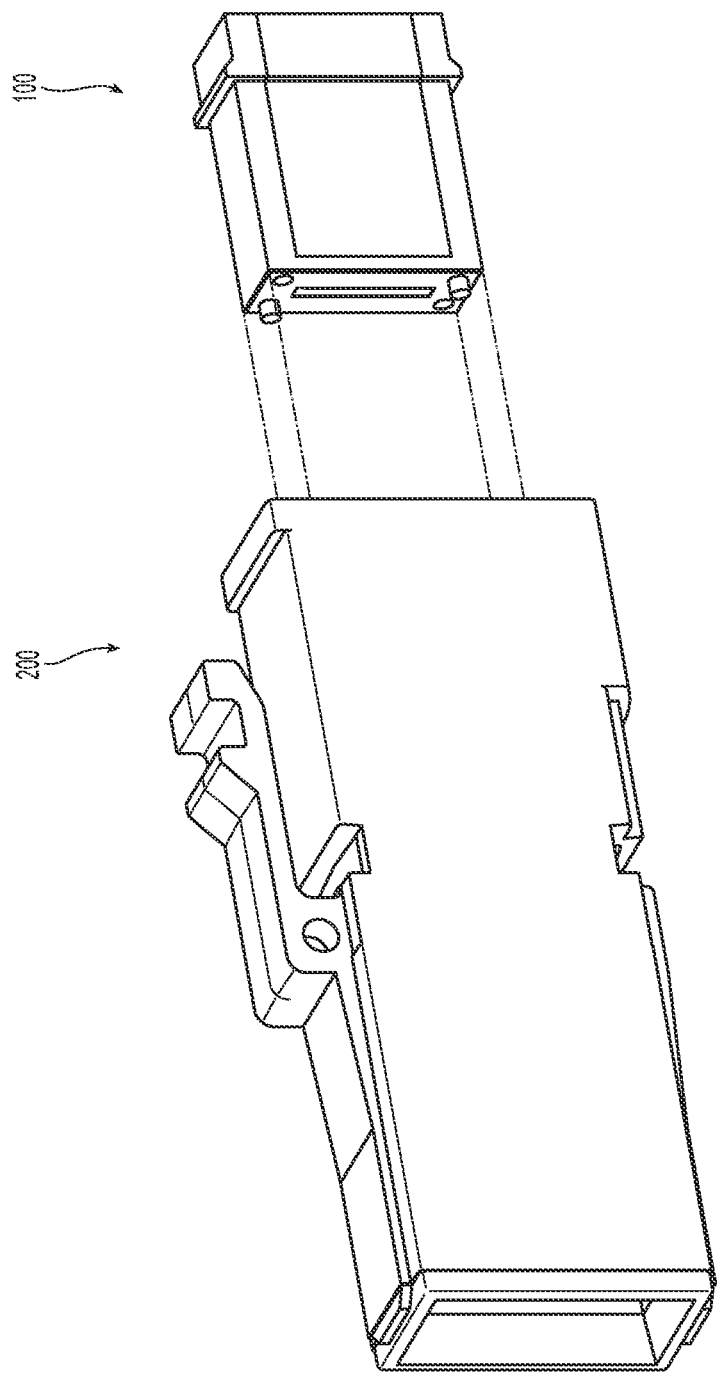
FIG. 10 is a perspective view of the fiber optic ferrule in FIG. 1 being inserted into a connector housing.

In certain applications, the fiber optic ferrules 100 would be first secured within a housing 200 of a fiber optic connector, the housing 200 is illustrated in FIG. 10.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A fiber optic ferrule comprising:
   a main body having a front end, a rear end, and a top surface and a bottom surface joined together by opposing side surfaces, the main body having a longitudinal axis extending between the front end and the rear end;
   a plurality of optical fiber support structures disposed between the front end and rear end and configured to receive a plurality of optical fibers;
   an end face at the front end of the fiber optic ferrule through which an optical beam passes; and
   a front facing refractive surface and a rear facing refractive surface both integrally molded with the main body, the front facing refractive surface and the rear facing refractive surface located between the end face and the plurality of optical fiber support structures, the rear facing refractive surface being closer to the end face than the front facing refractive surface, and being at an angle to the front facing refractive surface.

2. The fiber optic ferrule according to claim 1, wherein the front facing refractive surface and the rear facing refractive surface are separated from each other by a lens gap.

3. The fiber optic ferrule according to claim 1, wherein the end face has an exit window through which the optical beam passes and the exit window is not orthogonal to the longitudinal axis.

4. The fiber optic ferrule according to claim 1, further comprising two guide pins and two guide pin holes extending from the front end toward the rear end, the guide pins being diagonally spaced across the end face.

5. The fiber optic ferrule according to claim 1, wherein the front facing refractive surface and the rear facing refractive surface are disposed on surfaces that are not orthogonal to the longitudinal axis.

6. The fiber optic ferrule according to claim 1, wherein the front facing refractive surface and the rear facing refractive surface are convex lenses.

7. The fiber optic ferrule according to claim 6, wherein the convex lenses are integrally molded with the main body.

8. The fiber optic ferrule according to claim 1, further comprising an optical fiber facing surface, the optical fiber facing surface disposed between a front end of the plurality of optical fiber support structures and the front facing refractive surface.

9. The fiber optic ferrule according to claim 8, further comprising an optical fiber end face receptacle, the optical fiber end face receptacle disposed between the plurality of optical fiber support structures and the optical fiber facing surface.

10. The fiber optic ferrule according to claim 1, wherein the main body has a first portion and a second portion, the second portion comprising a portion of the top surface.

11. The fiber optic ferrule according to claim 1, the fiber optic ferrule according to claim 1, wherein the fiber optic ferrule is one of a mated pair of fiber optic ferrules, a second fiber optic ferrule in the mated pair is identical to the fiber optic ferrule with either the top surfaces of each of the fiber optic ferrules being on the same side the mated fiber optic ferrules, or the top surfaces being on opposing sides of the mated fiber optic ferrules.

12. The fiber optic ferrule according to claim 1, wherein the front facing refractive surface and the rear facing refractive surface are at different locations in a vertical direction between the top surface and the bottom surface.

13. The fiber optic ferrule according to claim 12, wherein the front facing refractive surface is closer to the bottom surface than the rear facing refractive surface.

14. A fiber optic connector comprising the fiber optic ferrule of claim 1, and having a housing in which the fiber optic ferrule is received and securely held.

* * * * *